UNITED STATES PATENT OFFICE.

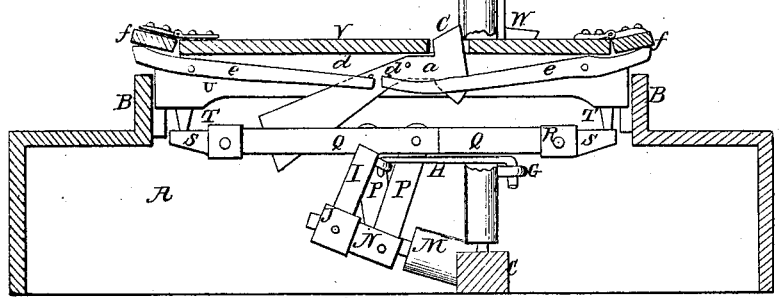
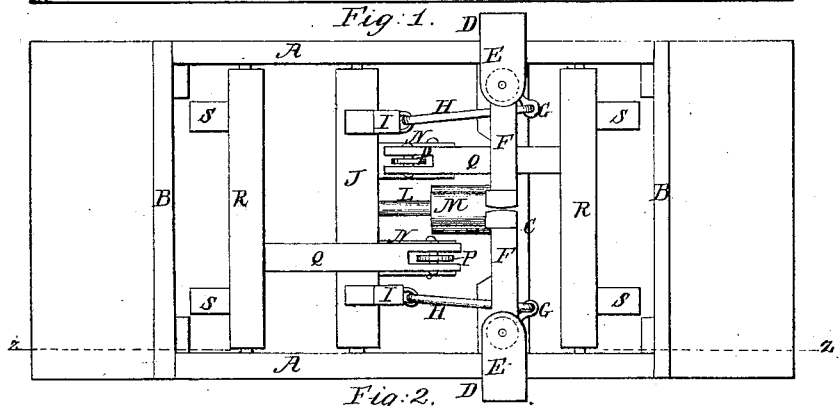
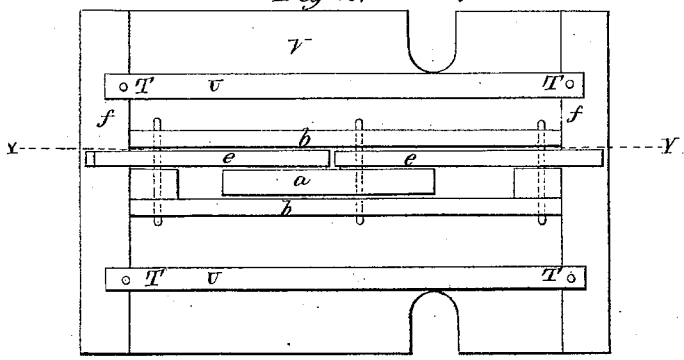

HEZEKIAH W. MISKIMEN, OF KINGSTON MINES, ILLINOIS.

IMPROVED AUTOMATIC GATE.

Specification forming part of Letters Patent No. 33,896, dated December 10, 1861.

*To all whom it may concern:*

Be it known that I, HEZEKIAH W. MISKIMEN, of Kingston Mines, Peoria county, and State of Illinois, have invented a new, useful, and Improved Automatic Gate; and I do hereby declare that the same is represented and described in the following specification and accompanying drawings.

The nature of my invention and improvement in automatic gates consists in the combination and arrangement of certain devices, hereinafter described, for operating the gate automatically by the weight of the animal and vehicle passing through or by it.

Figure 1 is a plan or top view of the gates and the devices for opening and closing them, the platform being removed to show the several parts clearly. Fig. 2 is a representation of the under side of the platform over which the animal and vehicle travel in passing through the gate. Fig. 3 is an elevation showing a section of Fig. 1 on the line Z Z and Fig. 2 on the line Y Y.

In the drawings, A A are the sides, and B B the ends, of an oblong rectangular plank box or frame placed in the ground. The lower edges of the sides are connected by the bar C. The posts D D are fastened to the sides A A and provided with caps E E, which extend over and are perforated for the upper pivots of the gates F to turn in. The lower pivots of the gates F F turn in the bar C. The perforated arms G G are fastened into the rotating stiles of the gates and are connected by the links H H to the arms I I in the rock-shaft J, which turns on pivots in the sides A A. The shaft J has an arm L fastened in it for the weight M, which turns the shaft J and closes the gates.

To turn the shaft J, raise the weight M and open the gates. I fasten the arms N, one of which is shown in Fig. 3, in the shaft J, and connect them by the links P P to the arms Q Q from the rock-shafts R R, the pivots of which shafts turn in the sides A A. There are two short arms S S in each of the rock-shafts R R for the studs T T in the sills of the platform to stand upon, which platform consists of the sills U U, covered with plank V for the animal and vehicle to travel over.

This platform should be so balanced by the weight M that when the animal comes onto it the weight of the animal, or animal and vehicle, will depress the platform, raise the weight M, and open the gates; and when the animal and vehicle have passed off of the platform the weight M descends and closes the gates.

To fasten and hold the gates when closed against the stop W, I arrange the locking-lever $a$ under the platform and hang it on a pin passing through the cleats $b\ b$ and make the locking end $c$ to work up through the platform and bevel it off the end $c$, so that as the gates close they will depress and pass over it, when it will rise and lock the gates. The rear end of the locking-lever $a$ is weighted or made so heavy as to raise the locking end, and in order to raise the rear end of this lever I fasten two pins $d\ d$ in it for the ends of the levers $e\ e$ to act against and raise it to unlock the gates, which levers $e\ e$ vibrate on pins passing through them and through the cleats $b\ b$. The outer ends of the levers $e\ e$ are depressed by the hinged vibrating planks $f\ f$, which are hinged to the ends of the platform, as shown in Fig. 3, so that when the animal or vehicle depresses the plank $f$ it raises the rear end of the locking-lever and unlocks the gate before the platform is depressed or pushed down to open the gate.

I believe I have described and represented my improved automatic gate so as to enable any person skilled in the art to make and use it.

I will now state what I desire to secure by Letters Patent, to wit:

1. In combination with the gates, the mechanism described for opening and closing them, consisting of the rock-shafts, arms, links, and weight, constructed and arranged as set forth.

2. The hinged vibrating plank at the end of the platform, in combination with the levers $e\ e$ and locking-lever $a$, constructed to operate as described, for the purpose set forth.

HEZEKIAH W. MISKIMEN.

Attest:
 S. W. PURSEE,
 DAVID MORRIS.